United States Patent
Tueshaus et al.

(10) Patent No.: US 11,680,656 B2
(45) Date of Patent: Jun. 20, 2023

(54) MIXING CARTRIDGE HAVING A VORTEX ELEMENT

(71) Applicant: GROHE AG, Hemer (DE)

(72) Inventors: Jan Philipp Tueshaus, Hemer (DE); Björn Riedel, Bochum (DE); Ole Benedikt Kostorz, Menden (DE)

(73) Assignee: GROHE AG, Hemer (DE)

( * ) Notice: Subject to any disclaimer, the term of this patent is extended or adjusted under 35 U.S.C. 154(b) by 0 days.

(21) Appl. No.: 17/312,114

(22) PCT Filed: Feb. 4, 2020

(86) PCT No.: PCT/EP2020/052706
§ 371 (c)(1),
(2) Date: Jun. 9, 2021

(87) PCT Pub. No.: WO2020/173671
PCT Pub. Date: Sep. 3, 2020

(65) Prior Publication Data
US 2022/0025983 A1   Jan. 27, 2022

(30) Foreign Application Priority Data
Feb. 26, 2019   (DE) .................... 10 2019 104 775.7

(51) Int. Cl.
*G05D 23/13*   (2006.01)
*F16K 11/00*   (2006.01)
(Continued)

(52) U.S. Cl.
CPC .......... *F16K 19/006* (2013.01); *F16K 11/044* (2013.01); *F16K 31/002* (2013.01); *G05D 23/1353* (2013.01)

(58) Field of Classification Search
CPC .................................................. G05D 23/1353
(Continued)

(56) References Cited

U.S. PATENT DOCUMENTS 2,655,356 A * 10/1953 Borcherts ............ F02M 31/087
                                                      137/98
RE24,398 E  * 12/1957 Kimball ............. G05D 23/1353
                                                    137/625.4
(Continued)

FOREIGN PATENT DOCUMENTS

DE         602 03 835       1/2006
DE   10 2007 055 455       5/2009
(Continued)

OTHER PUBLICATIONS

International Search Report dated Apr. 24, 2020, in International (PCT) Application No. PCT/EP2020/052706.

*Primary Examiner* — Robert K Arundale
(74) *Attorney, Agent, or Firm* — Wenderoth, Lind & Ponack, L.L.P.

(57) ABSTRACT

The invention relates to a mixing cartridge (1) for generating mixed water with a mixing temperature, having a hot water inlet (2) for hot water, having a cold water inlet (3) for cold water, having a mixing chamber (4), in which the hot and cold water can be mixed, and having a mixed water outlet (5) through which the mixed water can leave the mixing cartridge (1). According to the invention, the mixing cartridge (1) has at least one vortex element (6), which is arranged and/or designed in such a way that the water flowing through the mixing cartridge in a flow direction can be made to rotate, such that the water can form a water vortex.

15 Claims, 2 Drawing Sheets

Figure 1:
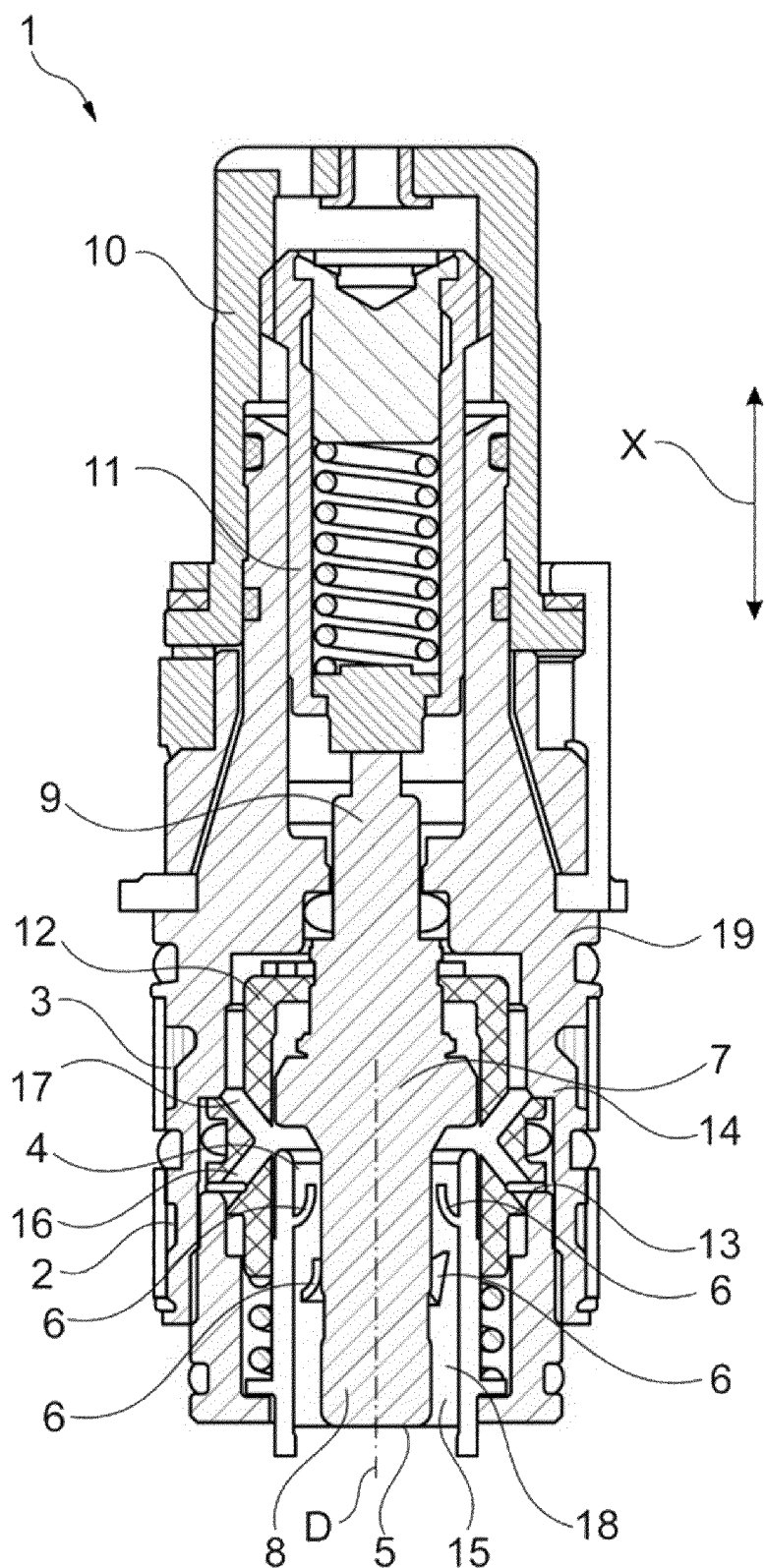

(51) Int. Cl.
 *F16K 11/044* (2006.01)
 *F16K 31/00* (2006.01)
(58) Field of Classification Search
 USPC ........................................................ 236/12.2
 See application file for complete search history.

(56) References Cited

U.S. PATENT DOCUMENTS

| | | | | |
|---|---|---|---|---|
| 5,203,496 A * | 4/1993 | Kline | ................ | G05D 23/1346 |
| | | | | 138/44 |
| 6,079,625 A | 6/2000 | Lebkuclmer | | |
| 7,140,394 B2 | 11/2006 | Eveleigh | | |
| 2003/0075611 A1 * | 4/2003 | Eveleigh | ............ | G05D 23/1346 |
| | | | | 236/101 D |
| 2008/0191043 A1 | 8/2008 | Goncze | | |
| 2009/0314844 A1 * | 12/2009 | Mace | ................ | G05D 23/1353 |
| | | | | 236/12.1 |
| 2010/0147963 A1 | 6/2010 | Goncze | | |
| 2013/0099007 A1 * | 4/2013 | Baker | ................ | B01F 25/1051 |
| | | | | 239/399 |

FOREIGN PATENT DOCUMENTS

| | | |
|---|---|---|
| EP | 1 118 049 | 7/2001 |
| EP | 1 189 127 | 3/2002 |
| EP | 2 407 849 | 1/2012 |
| EP | 3 043 229 | 7/2016 |
| JP | 2008-202702 | 9/2008 |
| WO | 97/32147 | 9/1997 |
| WO | 00/14615 | 3/2000 |
| WO | 2018/077807 | 5/2018 |

* cited by examiner

MIXING CARTRIDGE HAVING A VORTEX ELEMENT

This invention relates to a mixing cartridge for generating mixed water with a mixing temperature, having a hot water inlet for hot water, having a cold water inlet for cold water, having a mixing chamber in which the hot and cold water are mixed, and having a mixed water outlet through which the mixed water can leave the mixing cartridge.

DE 602 03 835 T2 discloses a thermostatic cartridge for mixing hot and cold water, an element for generating turbulences being arranged in the cartridge. The inner surface of this element has an irregular shape, by means of which the turbulences are formed in order to promote a temperature homogeneity between the out-flowing mixed water and a heat-sensitive area of a control element.

This invention addresses the problem of improving the flow behavior in the cartridge.

The problem is solved by a mixing cartridge having the features of the independent claim.

A mixing cartridge for generating mixed water with a mixing temperature is proposed. Mixing cartridges are used, for example, in sanitary facilities in a water faucet in order to provide mixed water with a specific, set and preferably constant mixing temperature, for example for showering.

The mixing cartridge has a hot water inlet for hot water and a cold-water inlet for cold water, wherein in one embodiment of the mixing cartridge, the volume of hot water and the volume of cold water flowing into the mixing cartridge can be adjusted in relation to the desired mixing temperature by the mixing cartridge. Alternatively, and also in relation to the desired mixing temperature, the corresponding volume of hot and cold water can be introduced into the mixing cartridge such that the mixing cartridge merely mixes the hot and cold water. The mixing cartridge has a mixing chamber for mixing the hot and cold water. This mixing chamber is obviously arranged in the flow direction of the water downstream of the two inlets such that in the mixing chamber, the hot water comes into contact and is mixed with the cold water to produce mixed water. The hot and the cold water furthermore initially converge in the mixing chamber. The mixing chamber is thus the area in which the hot and the cold water make the mixed water.

The mixing cartridge also has a mixed water outlet through which the mixed water can leave the mixing cartridge. In general, either a volumetric flow regulator can be arranged downstream of the mixed water outlet or the latter discharges the mixed water directly into a water faucet or a shower jet, or into a connecting line leading thereto.

According to the invention, the mixing cartridge has at least one vortex element, which is arranged and/or configured in such a way that the water can be made to rotate so that the water can form a water vortex. The water is the hot water and/or the cold water or the mixed water, a clear distinction among the latter not being possible because the mixing process can take place over an extensive area. However, the mixing of the hot and cold water or of the already partially mixed water can be improved with the aid of the water vortex. The vortex element is thus a mixing element. The flow direction of the water vortex is also largely directed (which applies to a lesser extent, for example, to a turbulent flow) such that a rate at which the water flows through the mixing cartridge is increased. The flow behavior of the water vortex is more similar to a laminar flow than to a turbulent flow. In addition, the water flows more smoothly through the mixed cartridge by means of the water vortex than with, for example, a turbulent flow.

Associated herewith is a quieter flow of the water through the mixing cartridge than in the case of a flow with turbulences, where rushing noises can occur.

The water vortex can also be described as a whirlpool. The water flows in circular or curved paths toward the mixed water outlet. The water thus flows to the mixed water outlet in a spiral or helical pattern, similarly to a drain. However, the mixing cartridge is completely filled with water such that a funnel-shaped water surface as in a drain whirlpool is not formed.

Also, the circular or curved paths of the water in the water vortex are to a large extent parallel to one another such that pressure fluctuations are reduced in the water vortex. Such pressure fluctuations can lead to the above-mentioned noises and they unevenly stress the mixing cartridge, such stresses being capable of leading to damage in the worst case.

The water vortex furthermore has a rotation axis, about which the water vortex rotates or about which the water moves in the circular or curved path. The rotation axis of the water vortex is furthermore oriented in parallel to the direction of the water flowing through the mixing cartridge.

It is advantageous if the at least one vortex element is arranged in the mixing chamber such that the water vortex can be formed in the mixing chamber. In order to mix the hot and cold water more thoroughly, the water vortex is thus formed once the hot and cold water have converged.

Additionally or alternatively, it is advantageous if the at least one vortex element is arranged in the flow direction downstream of the mixing chamber such that the water vortex forms in the flow direction downstream of the mixing chamber. The hot and cold water are thus completely merged with each other such that the entire flow of hot and cold water is thoroughly mixed by means of the water vortex.

It is also advantageous if the at least one vortex element is arranged in the flow direction downstream of the mixing chamber such that the water vortex can be formed in the hot water. The at least one vortex element is thus arranged in such a way that it does not swirl the cold water to produce the water vortex.

Additionally or alternatively, it is advantageous if the at least one vortex element is arranged in the flow direction downstream of the mixing chamber such that the water vortex can be formed in the cold water. The at least one vortex element is thus arranged in such a way that it does not swirl the hot water to produce the water vortex.

The water vortex can thus be formed either in the hot water or in the cold water, and then the other water can be supplied to the water vortex. The water vortex can then draw in the corresponding water.

Additionally or alternatively, it is also possible to form a water vortex in the hot water and to form a water vortex in the cold water as described above, in particular separately from each other, which vortexes then merge with each other in, for example, the mixing chamber. Accordingly, at least one vortex element is arranged in the hot water and at least one vortex element is arranged in the cold water. It is advantageous if these two water vortexes have the same rotation direction. This can be achieved by identically configured and/or oriented vortex elements downstream of the hot water inlet and downstream of the cold water inlet.

It is advantageous if the at least one vortex element is configured as a deflection element, which can divert the water transversely to the flow direction. A momentum in the circumferential direction can thus be imparted to the water, in particular the hot, cold and/or mixed water, flowing in the flow direction, which in turn leads to an angular momentum such that the water vortex is formed.

It is advantageous if the at least one vortex element is configured as an inclined surface. The inclined surface can be a guide surface, which forces the water into a circular or curved path such that the water vortex is formed. The inclined surface can be helical such that the inclined surface defines the flow direction of the water vortex.

It is also advantageous if the at least one vortex element is configured as a pocket that is open on one side. The flowing water contacts the pocket in the flow direction and can only flow out on the open side such that the water is diverted transversely to the flow direction and the water vortex forms.

It is advantageous if the mixing cartridge has multiple vortex elements, which are spaced apart from one another in a circumferential direction of the mixing cartridge. The water vortex can thus be formed more effectively. It is additionally or alternatively advantageous if the mixing cartridge has multiple vortex elements, which are spaced apart from one another in an axial direction of the mixing cartridge. The multiple vortex elements are thus also spaced apart from one another in the flow direction of the water. It is thus possible to sustain the water vortex when it moves through the mixing cartridge.

It is advantageous if the vortex elements are inclined toward one another in such a way that the vortex elements are oriented to one another in parallel to the flow direction of the water vortex. The vortex elements are thus spaced apart from one another in the direction of flow lines of the water vortex. After one vortex element, the flow lines of the water vortex thus come into direct contact with the next vortex element such that the water vortex is sustained or even strengthened. The vortex elements are therefore arranged helically with respect to one another, the water vortex extending from vortex element to vortex element.

It is advantageous if the mixing cartridge has a regulating element, by means of which the mixing temperature can be regulated, the regulating element advantageously being made of a thermal expansion material. If relatively hot water flows through the mixing cartridge, the regulating element expands, whereas the regulating element contracts if cooler water flows through the mixing cartridge.

The inflow of hot water or cold water through the corresponding hot water inlet or cold water inlet can be regulated by means of the expansion or contraction.

It is advantageous if the at least one vortex element is arranged and/or configured in such a way that the water vortex of the water is at least partially formed in an axial direction along the regulating element. Because the regulating element regulates the mixing temperature of the mixed water, for a quick adjustment the regulating element must be able to detect the mixing temperature of the mixed water as quickly as possible, meaning that the regulating element itself assumes the mixing temperature. The regulating element can be adapted quickly to the mixing temperature using the water vortex. For example, the water vortex can be used to interrupt a laminar flow around the regulating element, which surrounds the regulating element like a protective sheath and thus inhibits a temperature equalization between the regulating element and the mixed water. The laminar flow around the regulating element effectively interrupts the transfer of heat energy between the regulating element and the mixed water.

It is advantageous if the at least one vortex element is arranged in an annular gap between the regulating element and a housing of the mixing cartridge. The water vortex is thus formed in the annular gap. Not only is the water mixed better, but the temperature equalization between the regulating element and the water is also improved. The regulating gap can also be formed between the regulating element and an outlet pipe, which is inserted in the housing or is part of the housing.

It is also advantageous if the at least one vortex element is arranged on the regulating element and/or on the housing of the mixing cartridge. If the outlet pipe is present, the at least one vortex element can also be arranged on the outlet pipe.

It is advantageous if the mixing cartridge has a gate valve for regulating a water flow through the hot water inlet and the cold water inlet, which can be slid by the regulating element in an axial direction of the mixing cartridge, and if the at least one vortex element is arranged on the gate valve. With the gate valve, the hot water inlet and the cold water inlet can be at least partially closed and opened in order to regulate the mixed water temperature of the mixed water in accordance with the inflowing volume of hot and cold water.

Further advantages of the invention are described in the exemplary embodiments below. In the Figures:

FIG. 1: is a sectional view of a mixing cartridge with vortex elements and

Figure 2:
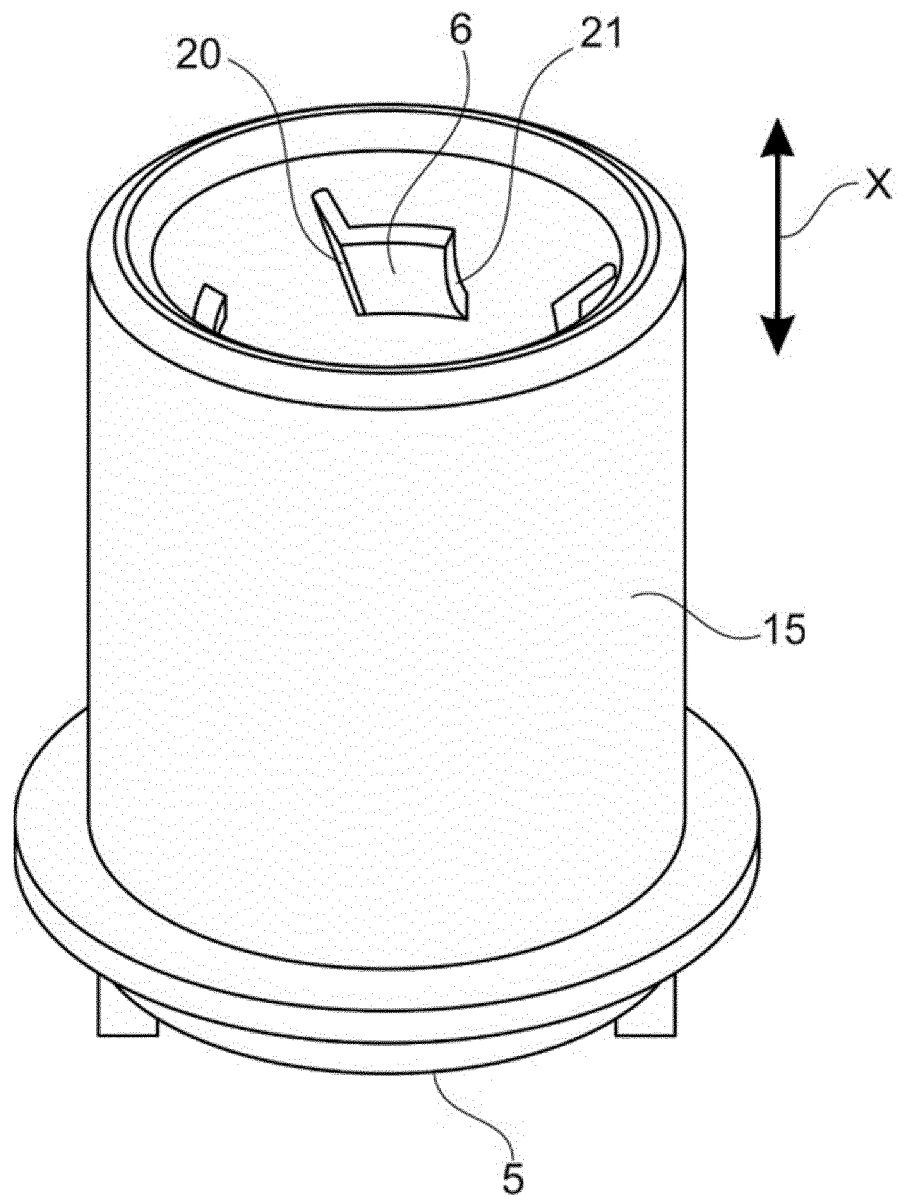

FIG. 2: is a perspective view of the vortex elements.

FIG. 1 shows a sectional view of a mixing cartridge 1 having vortex elements 6. By means of the mixing cartridge 1, mixed water with a mixing temperature can be generated and dispensed at a sanitary fitting, for example a water faucet or a shower jet.

The mixing cartridge 1 has a hot water inlet 2 for hot water and a cold water inlet 3 for cold water, via which the hot and the cold water are fed into the mixing cartridge 1. The mixing cartridge 1 furthermore has a mixing chamber 4, in which the hot and the cold water are mixed. The mixing chamber 4 is arranged in a flow direction of the water through the mixing cartridge 1 downstream of the two inlets 2, 3. The mixing chamber 4 starts where the hot and cold water converge. A mixed water outlet 5, through which the mixed water at the mixing temperature leaves the mixing cartridge 1, is arranged in the flow direction of the water downstream of the mixing chamber 4. The water faucet or the shower jet can be arranged downstream of the mixed water outlet 5. A mixing ratio and the temperatures of the hot and cold water thus determine the mixing temperature of the mixed water.

The mixing cartridge 1 of this exemplary embodiment has an operation element 10 for adjusting the mixing temperature of the mixed water. The operation element 10 is connected to a threaded element 11 by means of a threaded connection. If the operation element 10 is turned, the threaded element 11 is moved by the threaded connection in an axial direction X of the mixing cartridge 1. The movement of the threaded element 11 in the axial direction X is transferred to a regulating element 7, which can in turn move a gate valve 12 in the axial direction X. Depending on the position of the gate valve 12 in the axial direction X, the latter can open and close a hot water regulating gap 13 and a cold water regulating gap 14. Depending on the position of the gate valve 12, a corresponding volume of hot water and cold water, from which the mixed water with the mixing temperature is mixed, is piped into the mixing cartridge 1 through the hot water regulating gap 13 and the cold water regulating gap 14. According to the present exemplary embodiment, the hot water inlet 2, the cold water inlet 3, the hot water regulating gap 13 and the cold water regulating gap 14 extend in a circumferential direction around the mixing cartridge 1. The two regulating gaps 13, 14 are thus arranged in the mixing cartridge 1.

The regulating element 7 can furthermore be made of a thermal expansion material. The regulating element 7 thus expands, in particular in an axial direction X, if it is heated, and contracts, in particular in an axial direction X, if it is cooled. The regulating element 7 can thus maintain the mixed water at a nearly constant mixing temperature. If for any reason too much hot water (or too little cold water) flows into the mixing cartridge 1, the regulating element 7 heats up and expands, thereby moving the gate valve 12 in an axial direction X toward the mixed water outlet 5 such that the hot water regulating gap 13 is reduced and the cold water regulating gap 14 is enlarged and less hot water, but more cold water, can flow in. If on the other hand too much cold water (or too little hot water) flows in, the regulating element 7 contracts, whereby the gate valve 12 is moved away from the mixed water outlet 5 and the cold water regulating gap 14 is reduced and the hot water regulating gap 13 is enlarged such that less cold water, but more hot water, can flow in.

The regulating element 7 furthermore has a first end 8, which is arranged in the region of the mixed water outlet 5 or faces the latter. A second end 9 of the regulating element 7 is arranged opposite the first end 8 and interacts with the threaded element 11.

A hot water channel 16 runs from the hot water inlet 2 or from the hot water regulating gap 13 to the mixing chamber 4. A cold water channel 17 runs from the cold water inlet 3 or from the cold water regulating gap 14 to the mixing chamber 4. These channels meet at their ends and unite to form the mixing chamber 4, the latter being where the hot water and the cold water contact each other.

The water in the mixing cartridge 1 thus flows according to the flow direction from the two inlets 2, 3 through the mixing chamber 4 to the mixed water outlet 5.

Additionally, the mixing cartridge 1 has at least one vortex element 6, which is arranged and/or configured in such a way that the water flowing in the flow direction through the mixing cartridge 1 is made to rotate such that the water can form a water vortex. The water vortex is not shown here. In the present exemplary embodiment, the mixing cartridge 1 has multiple vortex elements 6, all of which are provided with the same reference symbol for the sake of simplicity and on account of their identical or at least similar effects.

The water vortex furthermore has a rotation axis D, about which it rotates. In the present exemplary embodiment, the rotation axis D is oriented in parallel to the axial direction X. The water vortex can also be described as a whirlpool, like the ones forming in a drain. Accordingly, the water vortex rotates about the rotation axis D and in doing so flows toward the mixed water outlet 5. The water vortex is therefore helical or spiraled.

The flow behavior of the water in the mixing cartridge 1 is improved by the water vortex. On one hand, the mixing of the hot and cold water is improved. On the other hand, the water flows faster through the mixing cartridge 1 when it flows to the mixed water outlet 5 in the water vortex than it would if it formed a turbulent flow, which would have a higher flow resistance. The water in the form of the water vortex also flows more smoothly through the mixing cartridge 1 than it would in the case of a turbulent flow. Furthermore, turbulent flows produce rushing noises, which can be prevented by the water vortex.

Additionally, a temperature equalization between the mixed water flowing in the water vortex and the regulating element 7, in particular the first end 8 of the regulating element 7, can be improved because the water vortex prevents a laminar flow around the regulating element 7, in particular the first end 8, which would surround the regulating element 7 like a protective sheath. The regulating element 7 can thus react faster to temperature fluctuations of the mixed water. The first end 8 of the regulating element 7 is advantageously the region which reacts to the temperature fluctuation.

According to the present exemplary embodiment, the at least one vortex element 6 is arranged on an outlet pipe 15 of the mixing cartridge 1.

Additionally, in this case the at least one vortex element 6 is arranged in an annular gap 18 between the regulating element 7, in particular the first end 8 of the regulating element, and the outlet pipe 15. Additionally or alternatively, the at least one vortex element 6 can also be arranged between the regulating element 7 and a housing 19 of the mixing cartridge 1.

The annular gap 18 of this exemplary embodiment or in general the space in which the water vortex forms is cylindrical. Like the water vortex, the annular gap 18 or the space for the water vortex is therefore rotationally symmetrical.

Additionally or alternatively, the at least one vortex element 6 can also be arranged on the regulating element 7. Likewise, additionally or alternatively, the at least one vortex element 6 can also be arranged in the mixing chamber 4, in the hot water channel 16 and/or in the cold water channel 17.

The mixing cartridge 1 can also have multiple vortex elements 6, as shown here. The latter are arranged at a distance from one another in a circumferential direction, in particular around the regulating element 7, such that the water vortex is formed more effectively. According to the present exemplary embodiment, other vortex elements 6 are arranged at a distance from one another in an axial direction X such that the water vortex is made to rotate further as it flows toward the mixed water outlet 5.

FIG. 2 shows a perspective view of multiple vortex elements 6. There, the vortex elements 6 are arranged in the outlet pipe 15 by way of example. The vortex elements 6 can also be arranged on the regulating element 7, in the hot water channel 16, in the cold water channel 17, in the mixing chamber 4 and/or on the housing 19.

According to this exemplary embodiment, the vortex elements 6 are configured as pockets. The pocket has a closed side 20 and an open side 21. The flowing water contacts the pocket and can only flow out on the open side 21 of the pocket, the water thus being made to rotate. This rotation and the superposition with the flow direction of the water toward the mixed water outlet 5 leads to the water vortex or whirlpool, which turns in the direction of the mixed water outlet 5. Flow lines of the water vortex are thus oriented diagonally, meaning that they have components in a circumferential direction and in an axial direction X or in the direction of the mixed water outlet 5.

According to the present exemplary embodiment, the water vortex flows in a clockwise direction or clockwise when viewed in the direction of the flow, which in this case corresponds to a direction in which the outlet pipe 15 is viewed from above. In the direction of view toward the mixed water outlet 5, in other words in a view of the water pipe 15 from below, the water vortex flows in a counterclockwise direction or counterclockwise. If the vortex elements 6 are arranged the other way around, obviously the direction of rotation of the water vortex can be reversed.

Additionally or alternatively, the at least one vortex element 6 can also be configured as an inclined surface. The vortex element 6 then resembles a stationary turbine blade. Additionally or alternatively, the at least one vortex element 6 can also be configured as a propeller blade, which is stationary with respect to the mixing cartridge (1).

This invention is not limited to the exemplary embodiments illustrated and described here. Modifications in the context of the claims as well as a combination of the features are possible, even if these features are presented and described in different exemplary embodiments.

LIST OF REFERENCE SYMBOLS

1 Mixing cartridge
2 Hot water inlet
3 Cold water inlet
4 Mixing chamber
5 Mixed water outlet
6 Vortex element
7 Regulating element
8 First end
9 Second end
10 Operation element
11 Threaded element
12 Gate valve
13 Hot water regulating gap
14 Cold water regulating gap
15 Outlet pipe
16 Hot water channel
17 Cold water channel
18 Annular gap
19 Housing
20 Closed side
21 Open side
X Axial direction
D Rotation axis

The invention claimed is:

1. A mixing cartridge (1) for generating mixed water with a mixing temperature, comprising:
a hot water inlet (2) for hot water,
a cold water inlet (3) for cold water,
a mixing chamber (4) in which the hot and cold water can be mixed,
a mixed water outlet (5) through which the mixed water can leave the mixing cartridge (1), and
a regulating element (7) made of a thermal expansion material and comprising at least one vortex element (6), wherein the at least one vortex element (6) is arranged and/or configured in such a way that water flowing in a flow direction through the mixing cartridge (1) can be made to rotate such that the water can form a water vortex.

2. The mixing cartridge according to claim 1, further comprising at least one vortex element (6) arranged in the mixing chamber (4) such that the water vortex can be further formed in the mixing chamber (4), and/or further comprising at least one vortex element (6) arranged in the flow direction downstream of the mixing chamber (4) such that the water vortex can be further formed in the flow direction downstream of the mixing chamber (4).

3. The mixing cartridge according to claim 1, further comprising at least one vortex element (6) arranged in the flow direction downstream of the hot water inlet (2) such that the water vortex can be further formed in the hot water, and/or further comprising at least one vortex element (6) arranged in the flow direction downstream of the cold water inlet (3) such that the water vortex can be further formed in the cold water.

4. The mixing cartridge according to claim 1, wherein the at least one vortex element (6) is configured as a deflection element, which can divert the water transversely to the flow direction.

5. The mixing cartridge according to claim 1, wherein the at least one vortex element (6) is configured as an inclined surface.

6. The mixing cartridge according to claim 1, wherein the at least one vortex element (6) is configured as a pocket, wherein the pocket is open on one side.

7. The mixing cartridge according to claim 1, wherein the mixing cartridge (1) comprises multiple vortex elements (6), which are spaced apart from one another in a circumferential direction and/or in an axial direction X of the mixing cartridge (1).

8. The mixing cartridge according to claim 7, wherein the multiple vortex elements (6) are inclined toward one another in such a way that the vortex elements (6) are oriented to one another in parallel to the flow direction of the water vortex.

9. The mixing cartridge according to claim 1, wherein the regulating element (7) regulates the mixing temperature.

10. The mixing cartridge according to claim 1, wherein the at least one vortex element (6) is arranged and/or configured in such a way that the water vortex of the water is formed at least partially in an axial direction (X) along the regulating element (7).

11. The mixing cartridge according to claim 1, further comprising at least one vortex element (6) arranged in an annular gap (18) between the regulating element (7) and a housing (19) of the mixing cartridge (1).

12. The mixing cartridge according to claim 1, further comprising at least one vortex element (6) arranged on a housing (19) of the mixing cartridge (1).

13. The mixing cartridge according to claim 1, wherein the mixing cartridge (1) further comprises a gate valve (12) capable of being moved by the regulating element (7) in an axial direction (X) of the mixing cartridge (1) for regulating a flow of water through the hot water and cold water inlets (2, 3), and further comprising at least one vortex element (6) arranged on the gate valve (12).

14. The mixing cartridge according to claim 1, further comprising at least one vortex element (6) arranged in an annular gap (18) between the regulating element (7) and an outlet pipe (15) of the mixing cartridge (1).

15. The mixing cartridge according to claim 1, further comprising at least one vortex element (6) arranged on an outlet pipe (15) of the mixing cartridge (1).

* * * * *